United States Patent [19]

Okahara et al.

[11] Patent Number: 4,604,321

[45] Date of Patent: Aug. 5, 1986

[54] MERCURY ADSORBING AGENT

[75] Inventors: Mitsuo Okahara, Kawanishi; Isao Ikeda, Suita, both of Japan

[73] Assignee: Nippon Petrochemicals Co., Ltd., Chiyoda, Japan

[21] Appl. No.: 655,349

[22] Filed: Sep. 27, 1984

[30] Foreign Application Priority Data

Sep. 29, 1983 [JP] Japan .............................. 58-181481

[51] Int. Cl.$^4$ .................... B05D 3/02; C08K 3/04; C08K 3/34; C08K 3/36

[52] U.S. Cl. ................................ 428/319.9; 210/679; 210/688; 210/914; 210/925; 210/927; 427/243; 427/385.5; 521/86; 521/150; 523/218; 524/444; 524/450; 524/448; 524/496; 524/789; 524/847; 524/856

[58] Field of Search ................. 523/218; 521/86, 150; 524/856, 444, 450, 847, 496, 448, 789; 428/319.9; 210/688, 679, 914, 925, 927; 427/243, 385.5

[56] References Cited

U.S. PATENT DOCUMENTS

| | | | |
|---|---|---|---|
| 2,112,529 | 3/1938 | Hazell | 521/150 |
| 2,185,586 | 1/1940 | Brooks | 521/150 |
| 2,507,869 | 5/1950 | Rothermel | 521/150 |
| 2,760,941 | 8/1956 | Ilker | 521/150 |
| 2,843,883 | 7/1958 | Rockoff | 521/150 |
| 4,094,777 | 6/1978 | Sugier et al. | 210/688 |
| 4,133,755 | 1/1979 | Tarao et al. | 210/688 |
| 4,206,080 | 6/1980 | Sato et al. | 210/925 |
| 4,394,473 | 7/1983 | Winter et al. | 524/571 |

FOREIGN PATENT DOCUMENTS

| | | | |
|---|---|---|---|
| 694335 | 9/1964 | Canada | 521/150 |
| 0102595 | 9/1974 | Japan | 210/688 |
| 0019376 | 2/1978 | Japan | 427/243 |
| 0032342 | 3/1978 | Japan | 427/243 |
| 1352009 | 5/1974 | United Kingdom | 210/914 |

*Primary Examiner*—Herbert J. Lilling
*Attorney, Agent, or Firm*—Bucknam and Archer

[57] ABSTRACT

An adsorbing agent and a method of preparation thereof is disclosed, which agent is capable of selectively adsorbing mercury from various mercury-containing gaseous or aqueous media at high rate of efficiency. The agent essentially comprises a porous material having a specific surface area in excess of 10 m$^2$/g. and a conjugated diolefin lower polymer deposited in a predetermined amount on the porous material.

8 Claims, No Drawings

MERCURY ADSORBING AGENT

BACKGROUND OF THE INVENTION

1. Field of the Invention

This invention relates to an adsorbent suitable for selectively adsorbing mercury from mercury-containing aqueous or gaseous materials.

2. Prior Art

The source of mercury and its compounds to be removed by adsorption or other methods is found largely in waste liquid or gas discarded for example from the sites of manufacture or use of chemicals, electrolytes, pharmaceuticals, insecticides, bactericides, agricultural drugs, dry cells, fluorescent lamps, instruments, or from the incinerators for city garbage, industrial wastes and sewage, or from mines, metal refineries, research institutes, hospitals and so on.

Generally, heavy metals can be disposed of by coagulative precipitation in the well known manner. This method however is not effective for the treatment of mercury which must be held to a very stringent control rate of 0.005 milligram per liter under existing legal environmental regulations.

Chelate resins are effectively used to adsorb and reduce mercury ions in a waste fluid to the statutory limits, but these resins are extremely costly and economically not feasible where they must be used in large amounts to handle high concentrations of mercury. Because of this and in view of the fact that mercury exists in complex forms in different wastes and its behaviour is not clearly known, there may be considered a pre-treatment in which a cascade of coagulative precipitation steps is used, or combinations of sulfurization, active carbon treatment and other methods. However, these alternatives would entail considerable initial investments and complicated control systems to maintain optimum operating conditions throughout the various stages of the process.

SUMMARY OF THE INVENTION

According to the invention, there is provided a mercury adsorbing agent which finds useful application in selectively adsorbing and thereby recovering mercury from aqueous or gaseous waste materials, the mercury being present often in the form of mercury ions and various mercury compounds, and which essentially comprises a porous solid carrier and a conjugated diolefin polymer deposited thereon.

It is an object of the present invention to provide a mercury adsorbing agent capable of removing high concentrations of mercury present in different forms in waste fluids at high rate of efficiency.

This and other objects and features of the present invention will become manifest to those versed in the art upon making reference to the following detailed description.

DETAILED DESCRIPTION

An important material constituting the adsorbing agent of the invention is a lower polymer of a conjugated diolefin of 4–8 carbon atoms including butadiene, isoprene, 1,3-pentadiene, cyclopentadiene and 1,3-octadiene. These may be homopolymerized or copolymerized. Alternatively, one or more of the conjugated diolefins may be copolymerized in greater proportions (above 50 weight percent) with vinyl monomers such as styrene and alkyl styrene. There are no particular limitations imposed upon the method of polymerization of the conjugated diolefins. Suitable methods include an anionic polymerization using alkali metals or their organometallic compounds, a cationic polymerization using Friedel-Crafts catalysts, a coordinated anionic polymerization using nickel or other transition metals, a telomerization using radical initiators, and a thermal polymerization.

Most preferred amongst the above conjugated diolefin polymers is a butadiene polymer containing more than 50 percent of 1,2 double bonds. Certain derivatives of the polymers are also eligible for the purpose of the invention. Such derivatives have in their polymers an acid group, an epoxy group, a hydroxyl group, an amino group and a mercapto group. Specific examples are polymers added with acrylic groups and maleic acid anhydride, or polymers which are epoxidized or which are epoxidized and then reacted with an amine or a mercaptan.

The conjugated diolefin polymers or their derivatives used in the invention may vary widely in the number average molecular weight between 300 and 50,000, but preferably between 500 and 5,000. Lower molecular weights would result in reduced deposit strength of the polymer with respect to the solid carrier and hence in reduced service life of the resulting adsorbent. Higher molecular weights would make the polymer difficult to be dissolved in solvents and would lead to considerable difficulty in its deposit operation due to too viscous solution.

The term porous solid carrier as used herein includes porous materials having a specific surface area of greater than 10 $m^2$ per gram, normally above 50 $m^2$ per gram and preferably greater than 100 $m^2$ per gram. Examples of such porous solid material include inorganic compounds such as alumina, silica gel, silicic acid, alumina silicate, crystalline aluminosilicate, clay, refractories, zeolite, diatomaceous earth, active carbon and mixtures thereof. These materials should preferably have a large breaking strength and a large surface area. With economy in view, alumina, silica gel, diatomaceous earth and the like are suitable. Most effective for the aqueous treatment is silica gel and most effective for the gaseous treatment is active carbon.

The amount of the conjugated diolefin polymer to be deposited on the porous carrier is optional depending upon the particular applications, but may be suitably 5–50 weight percent, and preferably 10–30 weight percent.

The polymer or its derivatives according to the invention may be deposited on the porous carrier in a process in which the polymer is dissolved in a solvent and the carrier is impregnated therein and then dried upon removal by distillation of the solvent. This solvent may be an aromatic hydrocarbon such as benzene, toluene, xylene and the like, a halogen-containing compound such as methylene chloride, or cellosolves such as butyl cellosolve.

For adsorbing mercury from a mercury-containing waste there may be considered a batch process in which the waste material is placed in a suitable bath containing the adsorbent of the invention and immersed therein with stirring or shaking for a predetermined length of time, or a fixed bed or fluid bed continuous process in which the mercury-containing waste is passed through a column packed with the adsorbent.

The mercury adsorbing agent of the invention is characterized by the maintenance of its ability over a relatively wide pH range of the mercury-containing waste material to be treated. This sharply contrasts with chelate resins in that the latter require complicated adjustment of the pH of the mercury-containing fluid to suit the ability of the particular chelate used. Another beneficial effect of the invention is found in the effective recovery of mercury owing to the high selectivity of the inventive agent that can adsorb and separate mercury alone from aqueous or gaseous waste materials containing a wide variety of heavy metals.

While the mechanism of such beneficial performance of the adsorbent of the invention is not clearly understood, it is believed that the porous solid carrier interacts physio-chemically with the conjugated diolefin polymer deposited thereon so as to exhibit peculiary strong affinity to mercury.

The invention will be further described with reference to the following examples in which percent (%) and parts are represented by weight.

EXAMPLE 1

10 grams of a butadiene polymer having a molecular weight of 1,500 (containing more than 60% of 1,2 double bonds) prepared by a chain-transfer anionic polymerization using alkyl sodium was dissolved in a methylene chloride solution. This solution was impregnated with 90 grams of dehydrated, dry silica gel having a specific surface area of 500 m²/gram, and thereafter the methylene chloride was distilled out thereby preparing an adsorbing agent having deposited thereon 10% butadiene polymer. 1 gram of this adsorbing agent was placed in a ground stopper Erlenmeyer flask, followed by addition of 20 milliliters of 379 ppm mercuric chloride solution. The admixture was shaken at 25° C. for 12 hours and the supernatant thereof was examined according to the General Rules for Atomic Absorption Spectrochemical Analysis (Japanese Industrial Standards K 0121) for mercury concentrations to be 0.288 ppm. Mercury adsorption was 99.9%. The amount of mercury in concentrations of 288 ppm adsorbed per gram of adsorbent was 7.59 milligrams and per gram of butadiene polymer was 75.9 milligrams.

EXAMPLE 2

The procedure of Example 1 was followed except for the conditions indicated in Tables 1-4 below.

TABLE 1

|  | Butadiene/ Silica Gel | Mercuric Chloride Initial ppm | Mercuric Chloride Final ppm | Mercury Adsorption % |
|---|---|---|---|---|
| Inventive Case | 10/90 | 48.8 | 0.264 | 99.4 |
|  | 20/80 | 48.8 | 0.202 | 99.6 |
|  | 50/50 | 48.8 | 8.98 | 80.3 |
| Comparative Case | 100/0 | 48.8 | 37.4 | 17.7 |
|  | 0/100 | 48.8 | 36.0 | 20.6 |

Table 1 above shows that mercury adsorption declines with excessive butadiene polymer deposits and also sharply declines in the absence of the porous carrier.

TABLE 2

| Specific Surface Area of Porous Carrier (m²/g) | Mercuric Chloride Initial ppm | Mercuric Chloride Final ppm | Mercury Adsorption % |
|---|---|---|---|
| Silica Gel (400) | 379 | 0.288 | 99.9 |
| Alumina (100) | 379 | 10.9 | 97.1 |
| Glass Wool (less than 5) | 379 | 273 | 28.1 |
| Non-porous Ocean Sand | 386 | 380 | 28.1 |

Table 2 above shows that effective mercury adsorption is obtainable with porous carriers of silica gel and alumina, particularly with silica gel.

TABLE 3

| Type of Polymer | Mercuric Chloride Initial ppm | Mercuric Chloride Final ppm | Mercury Adsorption % |
|---|---|---|---|
| Butadiene molecular weight 1,500 (65% 1,2 double bonds & 35% 1,4 double bonds) | 379 | 0.288 | 99.9 |
| cis-1,4 Butadiene molecular weight 700 (above 70% cis-1,4 double bonds) | 380 | 5.46 | 98.5 |
| Butadiene molecular weight 1,200 (above 40% 1,2 double bonds) | 380 | 0.290 | 99.9 |
| Butadiene-Styrene molecular weight 2,200 | 380 | 10.1 | 97.3 |
| Isoprene molecular weight 29,000 | 380 | 86.8 | 77.2 |
| DCPD molecular weight 400 | 380 | 49.8 | 86.9 |
| Soybean Oil | 386 | 205 | 46.6 |
| Liquid Paraffin | 379 | 278 | 26.8 |

It is evident from Table 3 above that lower polymers rich in 1,2 double bonds exhibit particularly effective mercury adsorption.

TABLE 4

| pH | Mercuric Chloride Initial ppm | Mercuric Chloride Final ppm | Mercury Adsorption % |
|---|---|---|---|
| 1.68 | 381 | 34.4 | 91.0 |
| 4.01 | 379 | 1.3 | 99.7 |
| 5 | 379 | 0.6 | 99.8 |
| 9.18 | 381 | 6.4 | 98.3 |
| 10.02 | 380 | 84.3 | 77.8 |

Table 4 above indicates that the adsorbing agent of the invention is capable of mercury adsorption over a wide pH range of the mercuric chloride solution.

EXAMPLE 3

1.0 gram adsorbing agent deposited with 10% butadiene polymer prepared by the procedure of Example 1 was placed in a 100-milliliter ground stopper Erlenmeyer flask, followd by addition of 20 milliliters of 1,500 ppm Hg++ solution. The admixture was shaken at 30° C. for 18 hours, and thereafter filtered and diluted. It was examined by the atomic adsorption analysis to reveal a mercury concentration of 100 ppm. This value was 1,100 ppm in the control case where silica gel was used without the butadiene polymer. It follows therefore that the rate of mercury adsorption was 99.3% with the inventive adsorbent and 26.7% with the carrier devoid of the polymer. The amount of mercury adsorption in 100 ppm mercury residues was 28 m.g per gram of the inventive adsorbent (or 280 m.g per gram of polymer) and 8 m.g per gram of carrier without polymer.

EXAMPLE 4

A column measuring 9.7 cm long and 1.8 cm in diameter was filled with 12.6 grams of the adsorbing agent prepared by the procedure of Example 1. 100/ppm $Hg^{++}$ solution was passed through the column and examined at the outlet to reveal a mercury concentration below the statutory limit of 0.005 m.g per liter. The mercuric chloride solution was continued to pass through the column until it reached 2,500 milliliters, when it was examined to show a mercury concentration of 0.1 ppm, indicating that the amount of mercury adsorbed through the column was about 20 m.g per gram adsorbent.

EXAMPLE 5

The procedure of Example 1 was followed except for the treatment of the various heavy metals with the results shown in Table 5 below.

TABLE 5

|  | Metal Salt Initial ppm | Metal Salt Final ppm | Mercury Adsorption % |
| --- | --- | --- | --- |
| Mercury | 379 | 0.288 | 99.9 |
| Cadmium | 300 | 298 | 0.6 |
| Lead | 200 | 200 | 0.0 |
| Copper | 300 | 297 | 1.1 |
| Calcium | 500 | 483 | 3.5 |

Table 5 clearly shows that the inventive adsorbing agent is capable of selection of mercury in particular amongst the other heavy metals.

EXAMPLE 6

The procedure of Example 1 was followed except for the use of the conjugated diene polymer derivatives with the results shown in Table 6.

TABLE 6

| Derivative of Polymer | Mercuric Chloride Initial ppm | Mercuric Chloride Final ppm | Mercury Adsorption % |
| --- | --- | --- | --- |
| Epoxidized Polybutadiene molecular weight 1,500 oxirane oxygen content 6.5% | 379 | 1.30 | 99.7 |
| Methylmercaptan Modified Epoxidized Polybutadiene | 379 | 0.65 | 99.8 |

What is claimed is:

1. A mercury adsorbing agent which consists of a porous solid carrier having a specific surface area greater than 10 $m^2/g$ and a conjugated diolefin which contains between 4 and 8 carbon atoms polymer deposited on said solid carrier wherein said solid carrier is a member selected from the group consisting of silica gel, alumina, diatomaceous earth, active carbon, crystalline aluminosilicate and zeolite, said conjugated diolefin polymer has a number average molecular weight of 300–50,000 and said conjugated diolefin polymer is deposited in an amount of 5–50 weight percent upon said carrier.

2. The mercury adsorbing agent according to claim 1 wherein said conjugated diolefin is butadiene, isoprene, 1,3-pentadiene, cyclopentadiene or 1,3-octadiene.

3. The mercury adsorbing agent according to claim 1 wherein said polymer is a copolymer of said conjugated diolefin with a vinyl monomer.

4. The mercury adsorbing agent according to claim 3 within the vinyl monomer is styrene or an alkyl styrene.

5. The mercury adsorbing agent according to claim 1 wherein said polymer is epoxidized polybutadiene or methyl mercaptan modified epoxidized polybutadiene.

6. The mercury adsorbing agent according to claim 1 wherein said conjugated diolefin lower polymer or derivative thereof, has a number average molecular weight between 500 and 5000.

7. A method of preparing a mercury adsorbing agent which comprises dissolving a conjugated diolefin which contains between 4 and 8 carbon atoms polymer of number average molecular weight of 300–50,000 in a solvent, impregnating therein a porous solid carrier of 10 $m^2/g$. or greater in specific surface area, and drying the same upon removal by distillation of said solvent.

8. The method of preparation of a mercury adsorbing agent according to claim 7 wherein said conjugated lower polymer is in an amount of 5–50 weight percent of said solid carrier.

* * * * *